(12) United States Patent
Svec

(10) Patent No.: US 9,912,284 B2
(45) Date of Patent: Mar. 6, 2018

(54) SELF-SEALING MOUNTING BRACKET FOR ROOF MOUNTED STRUCTURES

(71) Applicant: Building Materials Investment Corporation, Dallas, TX (US)

(72) Inventor: James A. Svec, Kearny, NY (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 15/293,498

(22) Filed: Oct. 14, 2016

(65) Prior Publication Data

US 2017/0108165 A1 Apr. 20, 2017

Related U.S. Application Data

(60) Provisional application No. 62/241,492, filed on Oct. 14, 2015.

(51) Int. Cl.
*H02S 20/23* (2014.01)
*F24J 2/52* (2006.01)
(Continued)

(52) U.S. Cl.
CPC .......... *H02S 20/23* (2014.12); *E04B 1/6801* (2013.01); *E04D 13/0404* (2013.01);
(Continued)

(58) Field of Classification Search
CPC ........ F24J 2/5245; F24J 2/5254; F16M 13/02; H02S 20/23; H02S 20/24; H02S 20/25;
(Continued)

(56) References Cited

U.S. PATENT DOCUMENTS

| 2,666,354 A | * | 1/1954 | Dim | F16B 43/001 |
| | | | | 118/264 |
| 3,232,162 A | * | 2/1966 | Ketchum | F16B 19/008 |
| | | | | 29/243.522 |

(Continued)

FOREIGN PATENT DOCUMENTS

EP 2 662 646 11/2013

OTHER PUBLICATIONS

"4+ Solar Self Seal Roof Mounting Brackets Unistrut/Superstrut. . . ," www.ebay.com.

*Primary Examiner* — Adriana Figueroa
*Assistant Examiner* — Jessie T Fonseca
(74) *Attorney, Agent, or Firm* — Womble Bond Dickinson (US) LLP

(57) ABSTRACT

A self-sealing mounting bracket includes an outer shell that defines at least one downwardly facing chamber. A plunger is located in the downwardly facing chamber and is slidable within the chamber. The chamber is filled with sealant either at the manufacturing facility or in the field. Larger openings are formed in the top of the outer shell that align with and provide access to bolt holes in the top of the plunger. Smaller openings in the top of the outer shell are for attaching the shell to a roof with lag bolts. The mounting bracket is located on a shingled roof and lag bolts are inserted through the larger openings and threaded into the roof deck. The heads of these lag bolts pass through the larger openings and engage the plungers to press the plungers down in their chambers. This, in turn, compresses, squeezes, and extrudes sealant between the mounting bracket and the roof below forming a water tight seal. The outer shell is then firmly attached to the roof with additional lag bolts inserted through the smaller openings and their aligned bolt holes and threaded into the roof deck. Mounting hardware for items such as solar panels can then be secured to the bracket.

13 Claims, 5 Drawing Sheets

(51) Int. Cl.
*E04B 1/68* (2006.01)
*E04D 13/04* (2006.01)
*E04D 13/16* (2006.01)
*F16M 13/02* (2006.01)

(52) U.S. Cl.
CPC ......... *E04D 13/1606* (2013.01); *F16M 13/02* (2013.01); *F24J 2/5245* (2013.01); *F24J 2/5254* (2013.01); *Y02E 10/47* (2013.01)

(58) Field of Classification Search
CPC ........ E04B 1/6806; E04B 1/38; E04B 1/6801; E04D 13/0404
See application file for complete search history.

(56) References Cited

U.S. PATENT DOCUMENTS

| | | | |
|---|---|---|---|
| 4,555,206 A * | 11/1985 | Sweeney | F16B 13/143 405/259.6 |
| 4,693,652 A * | 9/1987 | Sweeney | F16B 13/143 405/259.6 |
| 5,472,241 A | 12/1995 | Kosik, Jr. et al. | |
| 5,873,201 A * | 2/1999 | Fey | E04D 13/12 248/237 |
| 6,035,595 A * | 3/2000 | Anderson | E04F 13/045 411/258 |
| 6,536,729 B1 * | 3/2003 | Haddock | E04B 1/66 248/200 |
| 7,329,077 B2 | 2/2008 | Curtis | |
| 8,424,821 B2 | 4/2013 | Liu | |
| 8,689,517 B2 | 4/2014 | Schaefer et al. | |
| 8,733,718 B2 * | 5/2014 | Corsi | E04B 1/40 248/205.1 |
| 8,756,871 B1 * | 6/2014 | Johnson | E02D 31/02 52/2.14 |
| 2007/0079865 A1 | 4/2007 | Warfield et al. | |
| 2012/0005983 A1 * | 1/2012 | Stephan | F16B 43/001 52/741.4 |
| 2016/0226435 A1 * | 8/2016 | Almy | H02S 20/30 |
| 2016/0248367 A1 * | 8/2016 | Almy | H02S 20/23 |
| 2016/0248368 A1 * | 8/2016 | Seery | H02S 20/23 |
| 2016/0248369 A1 * | 8/2016 | Almy | H02S 20/23 |

\* cited by examiner

SELF-SEALING MOUNTING BRACKET FOR ROOF MOUNTED STRUCTURES

REFERENCE TO RELATED APPLICATION

Priority is hereby claimed to the filing date of U.S. provisional patent application 62/241,492 entitled Self Sealing Mounting Bracket for Roof Mounted Structures, which was filed on Oct. 14, 2015.

TECHNICAL FIELD

The invention exemplified in the embodiments described herein relates generally to roof mounted structures such as solar panels and more specifically to mounting brackets that are fastened to a roof to support roof such mounted structures.

BACKGROUND

There are many instances where items must be mounted to a shingled or other type of roof. Such items include, for example, satellite dishes, antennae, solar panels, support hardware, and other items. The mounting of such items to a shingled roof often requires that mounting brackets be secured to the roof with screws or nails and that the items be fastened to the mounting brackets. As a consequence, it is necessary to insure that rainwater does not leak through the shingles or through the roof deck at the location where a mounting bracket is secured and its mounting screws or nails extend through the shingles and decking.

In the past, sealing around a mounting bracket on a shingled roof has been accomplished in several ways. In some cases, tar or other sealants are simply spread on and around the mounting bracket in an attempt to prevent water penetration through screw or nail holes or beneath the edges of the bracket. In other cases, traditional flashing is installed to divert water flow over and around the bracket. In these instances, the flashing must be inserted underneath existing shingles upslope of the bracket. In order to insert the flashing, a flat pry bar typically is inserted under selected shingles to pry up existing roofing nails so that the flashing can be slid beneath a shingle tab. The flashing is then attached with nails or other fasteners and the upper shingle tab is laid back down atop the flashing.

These and other prior art methods of attaching and sealing a mounting bracket to a shingled roof often exhibit certain inherent problems and shortcomings. For example, applied tar or sealant can be poorly applied and, even when properly applied, often develop cracks and leaks over time due to exposure. This can allow rainwater to penetrate beneath the mounting bracket and leak through the shingles and the roof deck. In the case of flashing, lifting up tabs of existing shingles to insert the flashing underneath disturbs the integrity of the self-seal strip that normally holds the tabs down. The self-seal strip is not as robust once it has been broken in this manner. As a result, disturbed shingles or shingle tabs can be lifted in high winds and leaks can develop. This is especially important for newer roofs, which typically have excellent seal strip integrity when not disturbed.

A need exists for a mounting bracket and installation method that addresses these and other shortcomings of existing devices and methods of securing mounting brackets to a roof and sealing them against rainwater penetration. It is to the provision of such a mounting bracket and method that the present invention, illustrated herein by exemplary embodiments, is primarily directed.

SUMMARY

Briefly described, a self-sealing mounting bracket is disclosed for attachment to a roof. A shingled roof with shingles applied on top of a roof deck will be used in the discussion that follows, but the invention is applicable to other types of roofs as well. The bracket includes an outer shell formed to define one or more downwardly open chambers. A plunger is slidably disposed in each of the downwardly open chambers and each plunger can slide from a first or home position adjacent the roof of its chamber to a second position displace away from the roof of its chamber and toward the open end of the chamber. A first pair of larger openings is formed through the top of the outer shell for accessing bolt holes in the plungers. The larger openings each has a diameter larger than the diameters of the heads of bolts that will be used during installation of the mounting bracket. A set of smaller openings is formed through the top of the outer shell and each is aligned with a bolt hole in one of the plungers. Each of the smaller openings has a diameter smaller than the heads of bolts that will be used during installation of the mounting bracket.

Each chamber of the mounting bracket may be at least partially filled with a sealant such as silicone, caulk, asphalt, or another appropriate extrudable sealing material. The filling of the chambers can be done during manufacture or sealant can be packed into the chambers by installers on the job site using a caulking gun and/or spackling knife. The chambers may then be said to be at least partially loaded with sealant.

In use, the bracket is positioned on the roof atop existing shingles at a desired location. Lag bolts are inserted through the larger openings in the top of the outer shell and through the bolt holes of the plungers. The lag bolts are then treaded through the shingles, through the roof deck below, and tightened down against the plungers with a socket or wrench. The tightening of the lag bolts forces the plungers to slide from their first positions within the chambers a short distance toward their second positions. As a consequence, sealant within the chambers is forced downwardly by the syringe-like action of the plungers and is compacted against the underlying shingles. Some of the sealant may be squeezed outwardly beneath the edges of the outer shell as it is extruded and compacted by the plungers. Some of the sealant also my surround and compact against the lag bolts to seal the locations where they penetrate the shingles and the roof deck. The outer shell of the mounting bracket can then be securely attached to the roof with additional lag bolts inserted through the smaller openings and threaded into the roof deck below.

The mounting bracket has arrays of exposed threaded bores that are strategically located to accept machine bolts used to attach roof-mounted hardware such as a solar panel support frame member, an antenna support boot, or other structure to the bracket. The roof-mounted hardware is thus securely attached to the mounting bracket and the mounting bracket is securely attached and reliably sealed to the shingled roof below. The compacting and extruding of the sealant material ensures a seal between the shingles and the mounting bracket that is of very high integrity and that will last for many years.

Accordingly, a mounting bracket for shingled roofs is now disclosed that is self-sealing during installation thus eliminating problems and shortcomings of the prior art. The invention will be better appreciated upon review of the detailed description presented below taken in conjunction with the accompanying drawing figures, which are briefly described as follows.

DETAILED DESCRIPTION

Figure 1:
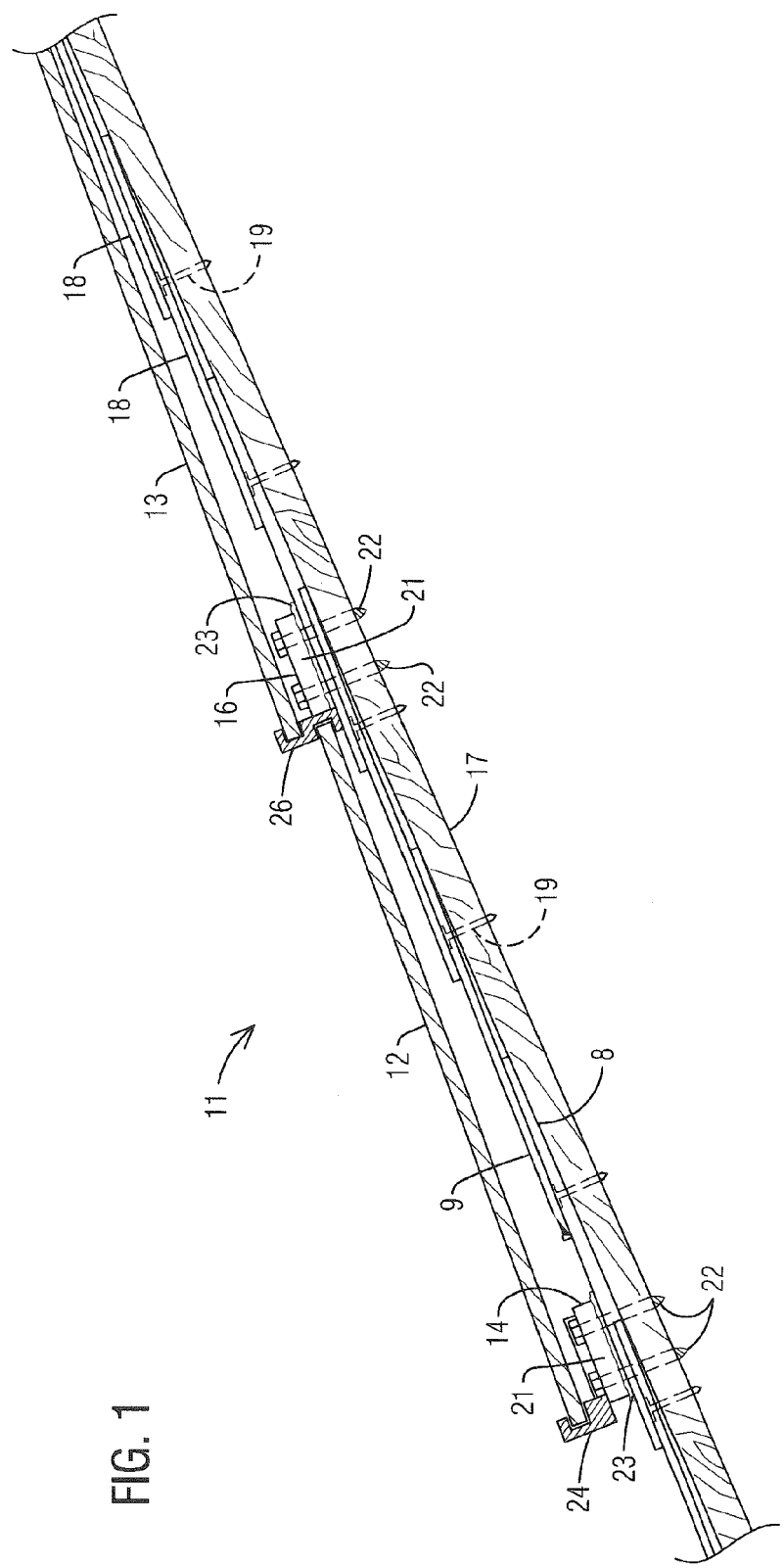
FIG. 1 is a side view of a section of a shingled roof with solar panels mounted to one embodiment of self-sealing mounting brackets of the present invention, which in turn are secured to the roof.

Reference will now be made in more detail to the drawing figures, which illustrate one preferred exemplary embodiment of the invention. FIG. 1 is a side view of a section of a shingled roof illustrating use of the self-sealing mounting bracket to mount hardware, such as a solar panel supports that secure solar panels to the roof. The roof 11 includes a roof deck 17 supported by rafters (not shown). Shingles 18 are installed on the roof deck 17 in the traditional manner and each has an exposed portion 9 that overlaps a headlap portion 8 of a shingle or shingles in a next lower course of shingles. The shingles are secured to the roof with roofing nails 19 driven through the headlap portions of the shingles and into the roof deck.

Self-sealing mounting brackets 14 according to one embodiment of the present invention are located and secured atop selected shingles in the exposed portions of the shingles. The self-sealing mounting brackets 14 are fastened to the roof with lag bolts as illustrated at 22. Sealant 23 has squeezed out around the self-sealing mounting brackets 14 and compacted against the shingle below the mounting brackets and thereby forms a seal of high integrity. As detailed below, the sealant is automatically compressed and extruded from the interior of the mounting brackets between the brackets and the roof, and is compacted tightly around each of the lag bolts, during the installation process. This creates a permanent water-tight seal between the mounting brackets and the shingles below.

In the illustrated example, a J-channel bracket 24 is mounted to the top of the lower self-sealing mounting bracket 14 and an S-channel bracket 26 is mounted to the forward edge of the upper self-sealing mounting bracket 14. The J-channel bracket 24 is configured to receive and hold the forward edge of a lower solar panel 12. The S-channel bracket 26 is configured to receive and hold both the rear edge of the lower solar panel 12 and the forward edge of upper solar panel 13. It will be understood by the skilled artisan that additional courses of self-sealing mounting brackets 14 and solar panels may be installed upslope of the illustrated courses to form a solar array of a desired size and configuration. It will further be understood that a wide variety of channels and brackets may be used in place of the J-channel and S-channel brackets shown in the embodiment of FIG. 1

Figure 2:
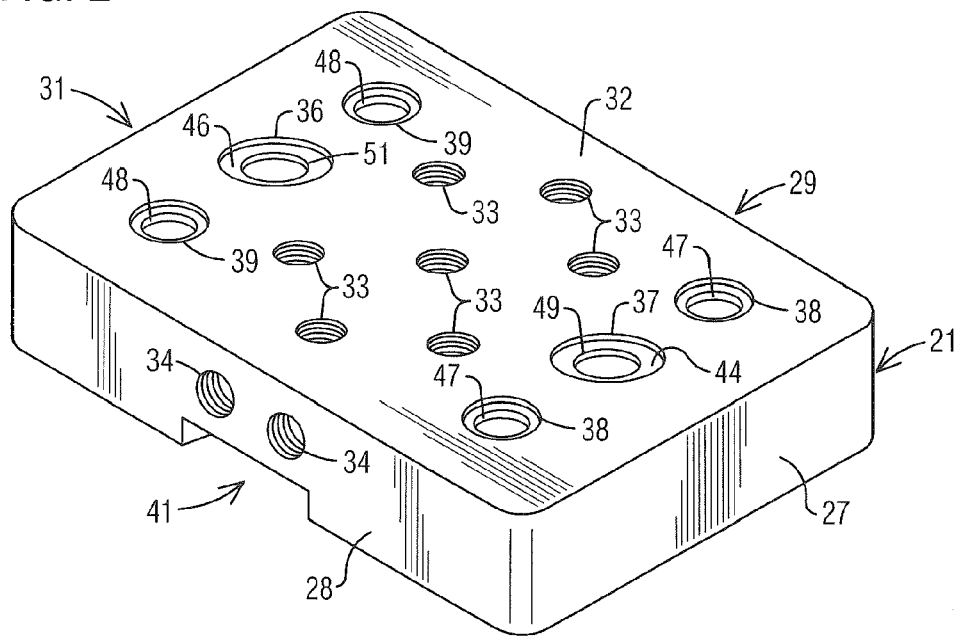
FIG. 2 is a perspective view of a self-sealing mounting bracket that exemplifies principles of the invention in one exemplary embodiment.

FIG. 2 illustrates one possible embodiment of a self-sealing mounting bracket 14 exemplifying principles of the invention. The self-sealing mounting bracket 14 includes a generally rectangular outer shell 21 that has a right side wall 27, a forward side wall 28, a rear side wall 29, and a left side wall 31. A top 32 spans the side walls of the outer shell 21. A central bottom channel 41 extends from the forward side wall 28 of the outer shell 21 through to the rear side wall 29 thereof. The outer shell 21 may be constructed of any appropriate material with sufficient strength and with sufficient resistance to deterioration from the elements. For example, the outer shell 21 may be molded from rugged plastic or other polymers. Preferably, however, the outer shell 21 is made of a rust resistant metal such as aluminum, copper, galvanized steel, or stainless steel.

Four smaller openings 38 and 39 are formed through the top 32 of the outer shell 21 near the left and right ends of the shell. Two larger openings 36 and 37 are formed through the top 32, each between one of the pairs of openings 38 and 39. The tops of interior plungers 44 and 46, which are described in more detail below, are visible through the openings 36, 37, 38, and 39. Bolt holes 47, 48, 49, and 51 are formed through the tops of the interior plungers and are accessible through the larger and smaller openings in the top of the outer shell 21. More specifically, smaller openings 38 and 39 align with bolt holes 47 and 48 respectively. Larger openings 36 and 37 align with bolt holes 49 and 51. The larger openings 36 and 37 have a diameter greater than that of the heads of lag bolts to be used to install the mounting bracket to a roof. Conversely, the smaller openings 38 and 39 have diameters that are smaller than the diameter of the heads of lag bolts to be used during installation.

A set or array of threaded bores 33 are formed through the outer shell 21 in the central portion of the top 32 for receiving machine bolts used to mount hardware to the bracket when the bracket is installed on a roof. A pair of threaded bores 34 is formed through the forward side wall 28 of the outer shell and another pair of threaded bores 35 (FIG. 3) is formed through the back side wall 29 of the outer shell. These threaded bores also are for receiving machine bolts used to mount hardware such as solar panel supports to the self-sealing mounting bracket 14 when installed on a roof. As detailed below, the threaded bores extend into the central portion of the shell 21, which is solid.

Figure 3:
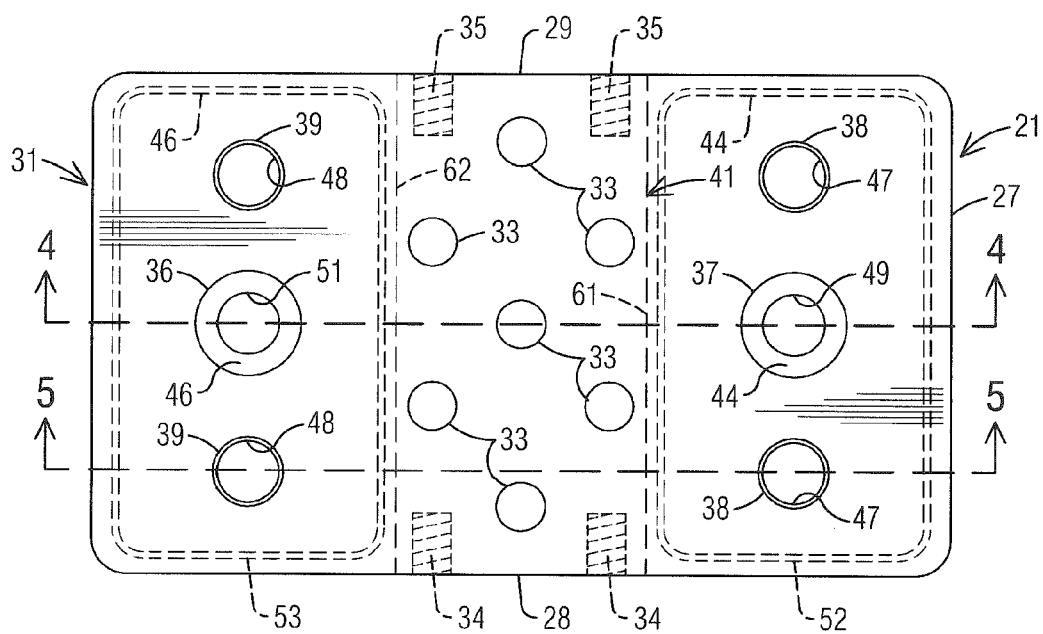
FIG. 3 is a top plan view of the self-sealing mounting bracket of FIG. 2 showing an exemplary configuration of openings and exposed threaded bores.

FIG. 3 is a top plan view of the self-sealing mounting bracket 14 with interior walls and components of the bracket shown in phantom lines. The outer shell 21 has sides 27, 28, 29, and 31 as mentioned above and further is formed with spaced interior walls 61 and 62. The interior walls 61 and 62 define the sides of central tunnel 41 (FIG. 2) and the central portion of the top 32 above the channel preferably is thick and solid. The bottom wall of the central portion forms the top of the central tunnel. Threaded bores 33, 34, and 35 are bored and tapped in the solid center portion of the outer shell so that hardware may be securely attached to the self-sealing mounting bracket 14 with machine bolts when the bracket is secured to a roof.

The walls of the outer shell 21 further define a first generally rectangular chamber 52 on one side of the central tunnel 41 and a second generally rectangular chamber 53 on the other side of the central tunnel 41. A first generally rectangular plunger 44 is slidably disposed in the first chamber 52 and a second generally rectangular plunger 46 is slidably disposed in the second chamber 53. The tops of the plungers 44 and 46 are clearly visible in FIG. 3 through the openings in the top of the outer shell 21. The bolt holes in the tops of the plungers 44 and 46 are seen to align with and be accessible through the openings in the top of the outer shell 21. Bolt holes 49 and 51 align with larger openings 36 and 37 respectively while bolt holes 47 and 48 align with smaller openings 38 and 39 respectively.

Figure 4:
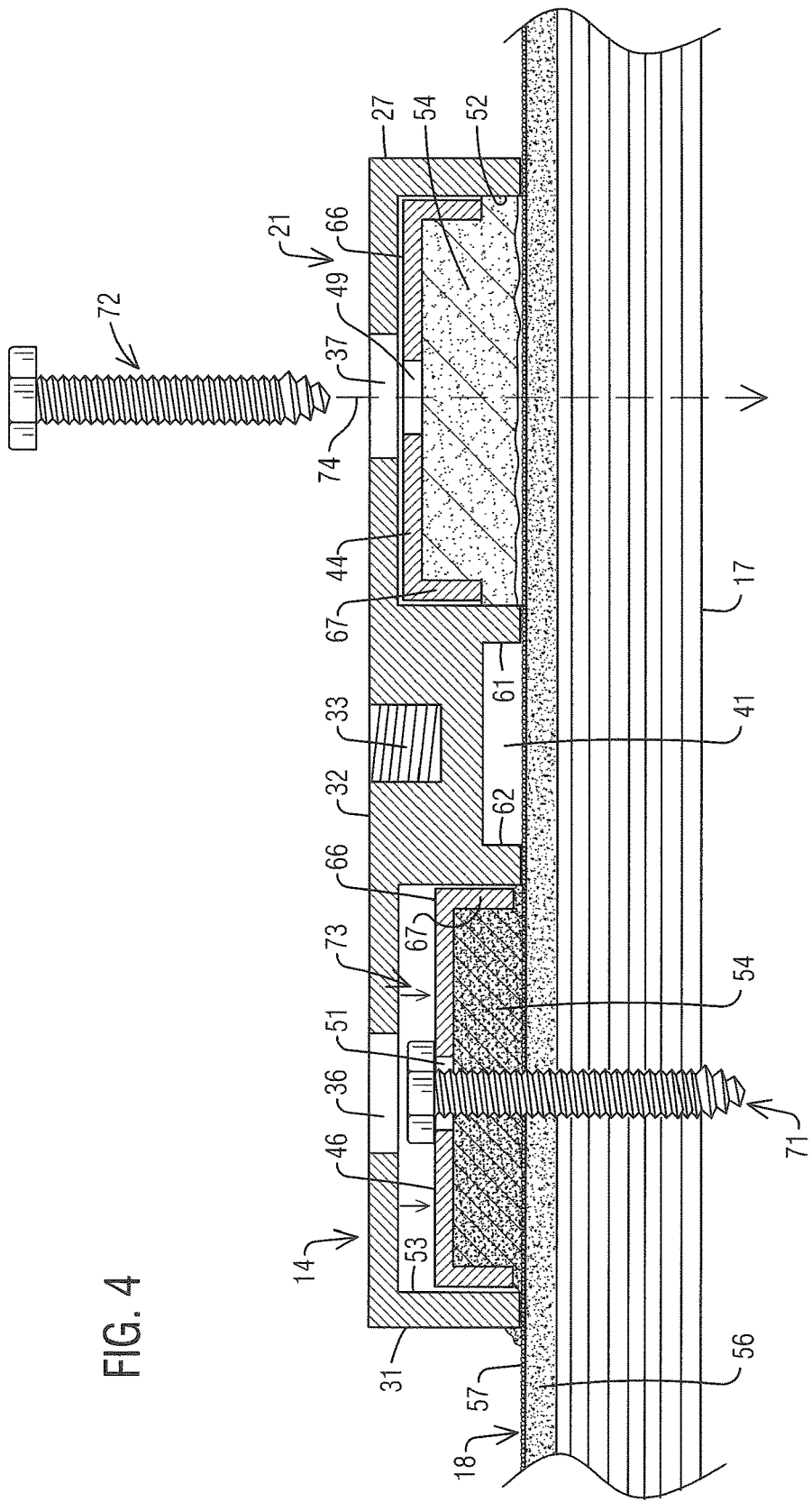
FIG. 4 is a cross-sectional view of the self-sealing mounting bracket of FIG. 3 taken along line 4-4 thereof illustrating an initial step in the installation of the mounting bracket.

FIG. 4 is a cross-section taken along line 4-4 of FIG. 3 and illustrates better the interior features and components of the self-sealing mounting bracket 14 and also illustrates the initial steps of the installation process. The outer shell 21 has right side 27, left side 31, and top 32. The first chamber 52 of the outer shell 21 is seen on the right in FIG. 4 while the second chamber 53 is seen on the left. The central portion of the outer shell 21 between the first and second chambers is seen to be thick and extends from the top 32 of the outer shell 21 to the top of the central tunnel 41. Walls 61 and 62 form the sides of the central tunnel 41 and also form the inner walls of the chambers 52 and 53.

A plunger 44 is slidably disposed in the first chamber 52 and a plunger 46 is slidably disposed in the second chamber 53. In this embodiment, each plunger has a top 66 and a depending peripheral skirt 67. In FIG. 4, the plunger 44 is shown slid within the chamber 52 to its top-most position while plunger 46 is shown slid down within the chamber 53 toward a bottom position. The volume beneath each of the plungers within the chambers 52 and 53 is at least partially filled with a malleable, viscous, and extrudable sealant 54. The sealant 54 can be any appropriate extrudable material capable of forming a water tight seal between the self-sealing mounting bracket 14 and a shingled roof of a home. For example, the sealant may be an adhesive, a silicone, a rubber-based sealant, an asphalt-based sealant, caulk, or any other material with similar properties. In this regard, the term "sealant" should be construed to include any malleable extrudable material that can form a seal between an item and a shingled roof.

The chambers 52 and 53 can be at least partially pre-filled with sealant at the manufacturing facility and the sealant can be held in the chambers and protected with a peel-away membrane that is removed at the time of installation. This ensures that the proper volume of sealant is contained in each of the chambers. Alternatively, the chambers can be filled by an installer at the time of installation using a spackling knife to pack sealant into the chambers. With continued reference to FIG. 4, the cross-section 4-4 (FIG. 3) passes through larger openings 36 and 37 in the top 32 of the outer shell and also through bolt holes 49 and 51 in the tops of the plungers 44. The cross-section also passes through the central threaded bore 33 in the top of the outer shell 21

With continued reference to FIG. 4, a lag bolt 71 at the left portion of the mounting bracket has been inserted through the larger opening 36, through the bolt hole 51, and has been treaded through the shingles 18 and roof deck 17. The tightening of the lag bolt 71 has forced the plunger 46 downwardly toward the shingle 18. This, in turn, has compressed the sealant 54 against the surface of the shingle 18, forcing the sealant to extrude into every nook and void created by the granules and texture of the shingle. Further, the compression of the sealant may cause some of the sealant to be squeezed out beneath the edges of the plunger and beneath the edges of the outer shell. A permanent seal of high integrity is thus formed as the lag bolt 71 is tightened down. On the right hand side in FIG. 4, a second lag bolt 72 is shown just about to be inserted through larger opening 37 and bolt hole 49. The lag bolt 72 also will be threaded into the roof deck and tightened down to compress the sealant 54 and form a seal in the same way. It will be seen from FIG. 4 that the larger openings 36 and 37 in the top of the outer shell allow the heads of the lag bolts 71 and 73 to pass through them to tighten against the tops of the plungers 44 and 46.

Figure 5:
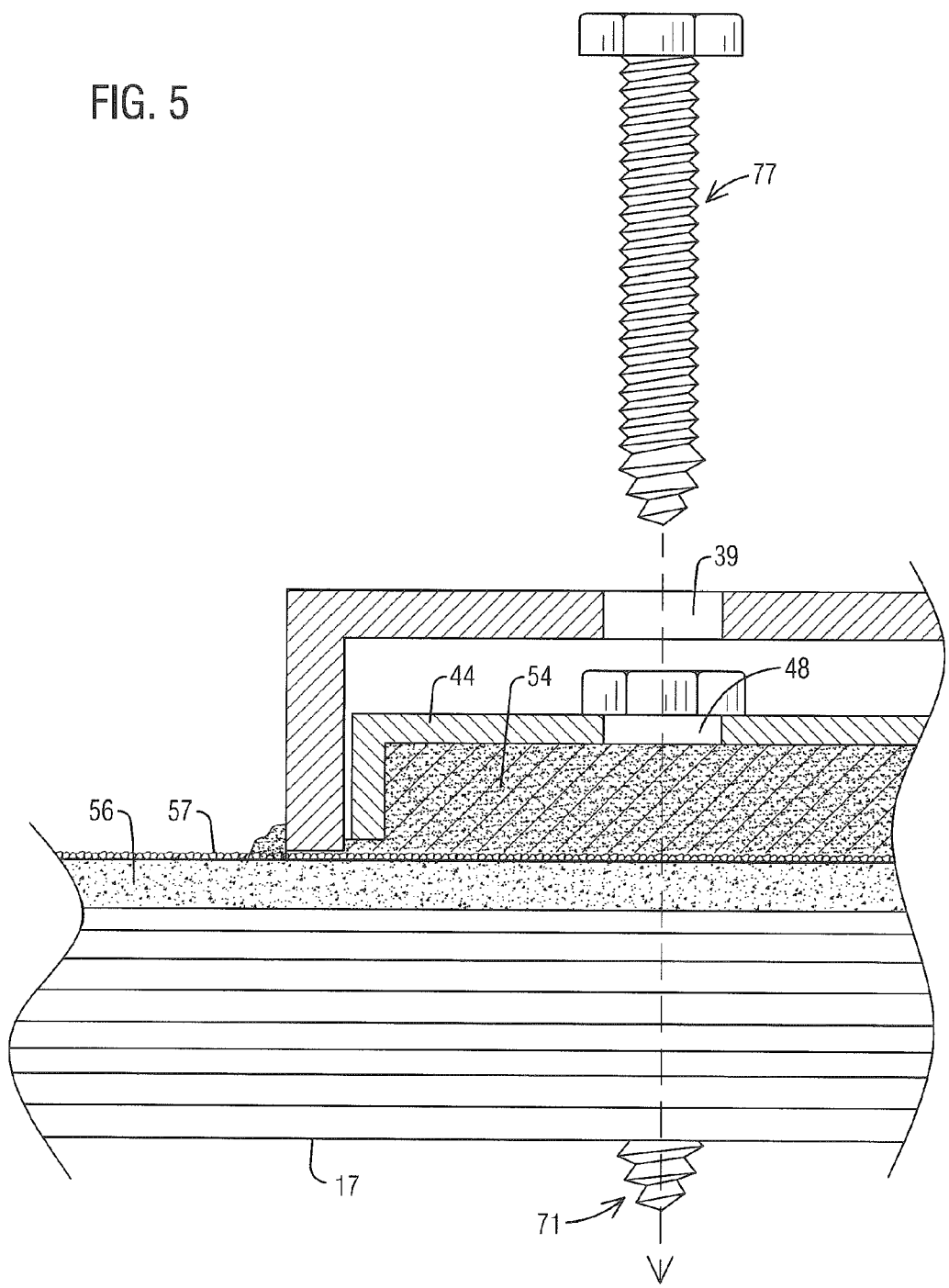
FIG. 5 is a cross-sectional view of one end portion of the self-sealing mounting bracket illustrating a further step in the installation of the mounting bracket.

FIG. 5 is a cross-section taken along line 5-5 of FIG. 3 showing the left portion of the mounting bracket and illustrating the second stage of installation. Here, lag bolt 71 is seen in the background having already been tightened atop the plunger 44 to form a seal between the mounting bracket and granules 57 of an asphalt shingle 56 below. A lag bolt 77 is shown being advanced to extend through the smaller hole 39 in the top of the outer shell and the bolt hole 48 in the top of the plunger 44. Before the lag bolt 77 is inserted, a pilot hole can be drilled through the compressed sealant within the chamber 53 and through the roof deck if desired. The lag bolt 77 can then be threaded through the pilot hole and into the roof deck until the head of the lag bolt contacts the top of the outer shell. Lag bolts are similarly threaded through the other three smaller openings and aligned bolt holes and threaded into the roof deck. The four lag bolts can then be tightened so that the outer shell of the mounting bracket is securely fixed and sealed to the roof deck.

Figure 6:
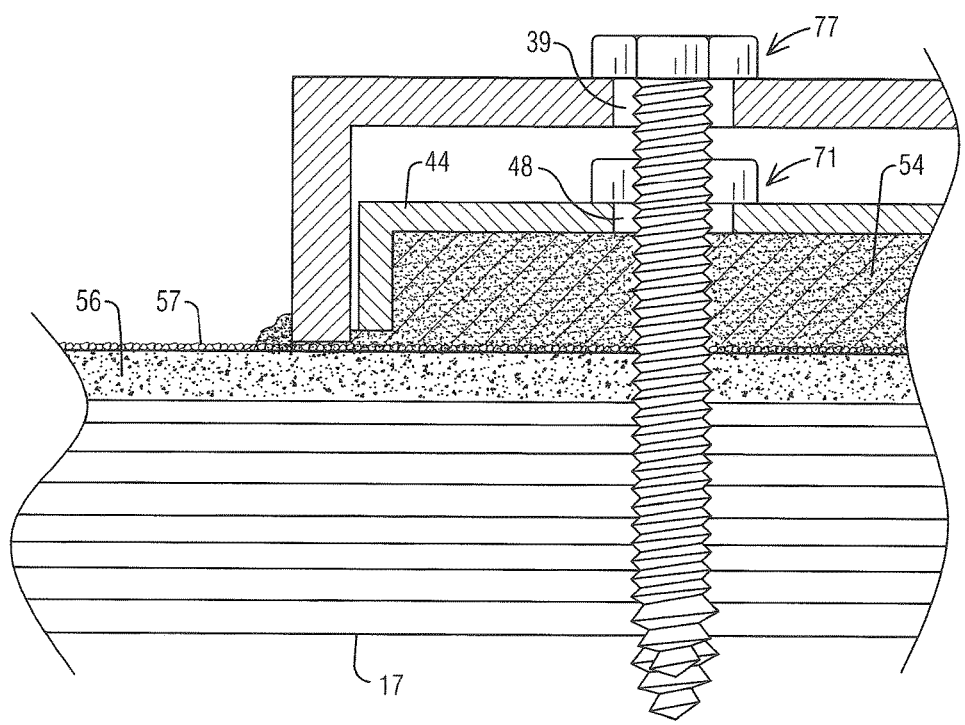
FIG. 6 is a cross-sectional view of the end portion of the self-sealing mounting bracket of FIG. 5 as it appears after having been sealed and secured to a roof.

FIG. 6 shows the same portion of the mounting bracket as FIG. 5 after the lag bolt 77 has been threaded and tightened as described to secure the outer shell of the bracket to the roof. As in FIG. 5, lag bolt 71 is seen in the background and lag bolt 77 is seen in the foreground. It will be appreciated that the larger hole 36 has allowed the head of lag bolt 71 to pass through it and engage the top of plunger 44 to force the plunger 44 downwardly. Conversely, the smaller opening 39 ensures that the head of the lag bolt 77 engages and tightens against the top of the outer shell to secure the outer shell and thus the entire mounting bracket to the roof below. With regard to the lag bolts, it is preferred that all 6 lag bolts that are used to form a seal and to secure the mounting bracket be the same size such as, for example, ⅜ inch×3 inches. In this way, an installer can use a single tool, e.g. a ⅜ inch socket, to form the seal and to secure the mounting bracket to a roof.

Once mounted to a roof and sealed as described, a wide variety of hardware can be secured to the mounting brackets with machine screws threaded into one or more of the threaded bores 33, 34, and 35. The secured hardware can then be used to receive and hold a wide variety of roof-mounted items to the roof such as, for instance, solar panels, satellite dishes, antenna, guy-wires, and large vent hoods. The brackets of this invention are considered to be particularly useful for mounting support hardware for solar panels to a roof but can be used to mount virtually any item that needs to be positioned and secured on the roof of a home or commercial building.

The invention has been described herein in terms of preferred embodiments and methodologies considered by the inventor to represent the best modes of carrying out the invention. It will be understood by the skilled artisan, however, that a wide range of additions, deletions, and modifications, both subtle and gross, might well be made to the illustrative embodiments within the scope of the invention. For instance, the installation process might be changed so that the outer shell is first secured to a roof followed by the formation of seals by screwing the plungers down toward the roof. In such an embodiment, the mechanism for advancing the plungers may not need to be threaded into the roof itself. For example, they might simply be machine screws that thread through the top wall of the outer shell and engage the upper wall of the plunger to force the plunger down.

The particular rectangular configuration of the mounting bracket shown in the exemplary embodiment is not a limitation of the invention. In fact, the concepts of the invention can be embodied in a wide variety of configurations as dictated by need. For example, disc-shaped, square, triangular, or other shapes might be appropriate for a particular application. Further, one chamber and plunger might be sufficient for certain applications while 3 or more chambers and plungers might be needed for others.

The mounting bracket of this invention is not limited to use with shingled roofs, but also may be used on other types of roofs such as metal roofs, tile roofs, slate roofs, and the like. Also, structures other than threaded bores may be provided on the mounting bracket for attaching auxiliary mounting hardware. Such structures might include, for instance, spring clips, locking channels, snap fittings, or any other structures by which hardware can be secured to the mounting bracket. These and other variations might be implemented by the skilled artisan without departing from the spirit and scope of the invention as set forth in the claims.

What is claimed is:

1. A self-sealing mounting bracket for use in securing items to a roof, the self-sealing mounting bracket comprising:
    an outer shell having a top wall and defining at least one downwardly open chamber;
    structures on the outer shell by which auxiliary hardware may be selectively secured to the mounting bracket;
    a plunger having an upper surface and being slidably disposed in the at least one downwardly open chamber, the plunger being movable between a first position adjacent the top wall of the outer shell and a second position displaced downwardly from the first position;
    a first mechanism for selectively moving the plunger from its first position toward its second position when the self-sealing mounting bracket is being secured to a roof;
    a second mechanism separate from the first mechanism for securing the outer shell to the roof without engaging the plunger;
    sealant within the at least one downwardly open chamber being compressed against the roof when the plunger is selectively slid toward its second position to form a seal between the self-sealing mounting bracket and the roof.

2. A self-sealing mounting bracket as claimed in claim 1 wherein the at least one downwardly open chamber comprises two or more downwardly open chambers and further comprising a two or more plungers slidably disposed in each of the two or more downwardly open chambers, and mechanisms for moving each of the two or more plungers from first positions adjacent the top wall of the outer shell toward second positions downwardly displaced from the first positions to compress sealant in the two or more chambers against the roof to form a seal.

3. A self-sealing mounting bracket as claimed in claim 1 wherein the first mechanism comprises an opening formed through the upper surface of the plunger sized to receive a fastener.

4. A self-sealing mounting bracket as claimed in claim 3 wherein the fastener comprises a bolt that may be advanced through the opening formed through the upper surface of the plunger and threaded into the roof to move the plunger toward its second position.

5. A self-sealing mounting bracket as claimed in claim 4 wherein the bolt has a head and further comprising an opening in the top wall of the outer shell, the opening in the top wall being aligned with the opening through the upper surface of the plunger and being sized to allow the head of the bolt to pass through the opening in the top wall.

6. A self-sealing mounting bracket as claimed in claim 1 wherein the second mechanism comprises at least one bolt.

7. A self-sealing mounting bracket as claimed in claim 6 wherein the bolt has a head and wherein the second mechanism further comprises aligned openings in the top wall of the outer shell and the upper wall of the plunger through which the bolt may be advanced and secured to the roof, the opening in the top wall of the outer shell being smaller than the head of the bolt.

8. A self-sealing mounting bracket as claimed in claim 1 further comprising a sealant disposed in the at least one downwardly open chamber.

9. A self-sealing mounting bracket as claimed in claim 8 wherein the sealant is disposed below the plunger.

10. A self-sealing mounting bracket as claimed in claim 1 wherein the sealant is loaded into the at least one downwardly open chamber at the time of installation of the self-sealing mounting bracket.

11. A self-sealing mounting bracket as claimed in claim 1 wherein the structures on the outer wall comprises threaded bores for receiving bolts.

12. A self-sealing mounting bracket as claimed in claim 11 wherein the outer shell has sides and wherein at least one of the threaded bores is formed in the sides of the outer shell.

13. A self-sealing mounting bracket as claimed in claim 12 and wherein at least one of the threaded bores is formed in the upper surface of the outer shell.

* * * * *